March 26, 1940.  F. D. BRYANT ET AL  2,195,237
ELECTRIC SWITCH
Filed Dec. 31, 1937
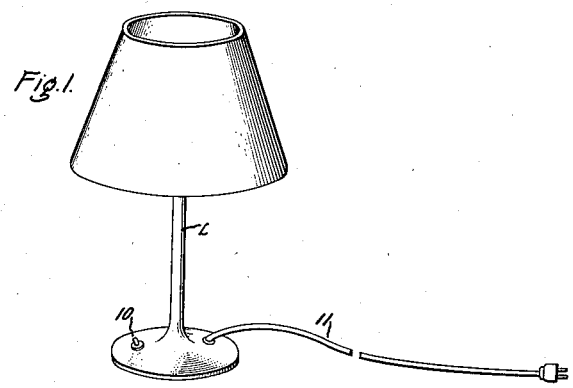
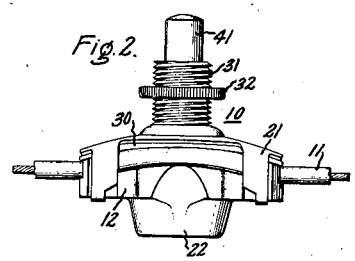
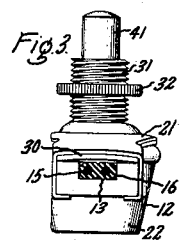
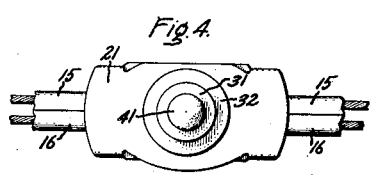
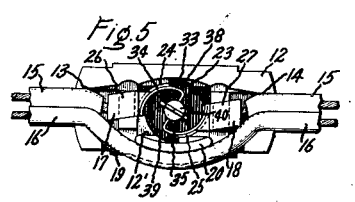
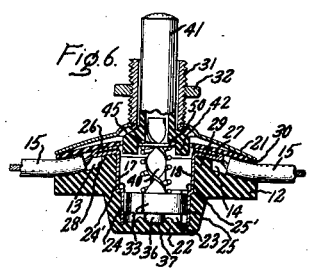
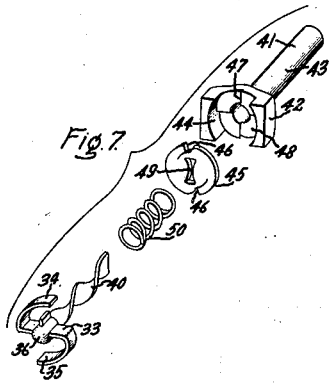
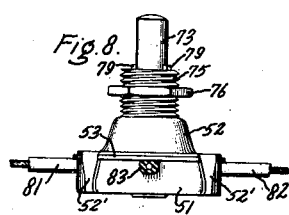
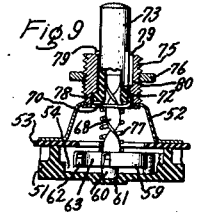
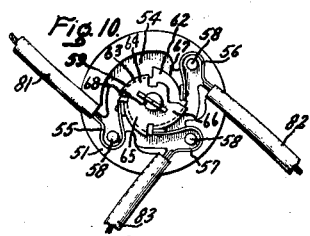
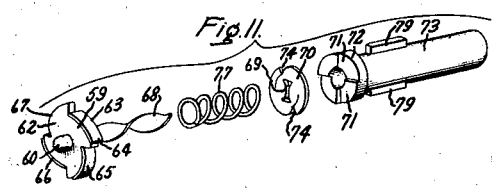
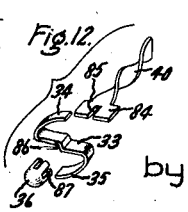
Inventors:
Frank D. Bryant,
William R. Young,
by Harry E. Dunbar
Their Attorney.

Patented Mar. 26, 1940

2,195,237

UNITED STATES PATENT OFFICE 2,195,237

ELECTRIC SWITCH

Frank D. Bryant, Stratford, and William E. Young, Fairfield, Conn., assignors to General Electric Company, a corporation of New York Application December 31, 1937, Serial No. 182,766

3 Claims. (Cl. 200—156)

This invention relates to a combined cord set and electric switch, and more particularly to a cord set and switch which may be assembled and sold as a unit.

It is an object of the invention to provide a cord set with a switch mounted upon the conductors at the correct location so that the switch and cord terminal may be installed easily upon an electrical appliance.

It is another object of the invention to provide a switch which will have an improved construction and arrangement, which will be compact and reliable in operation, and which may be attached easily and securely to the conductors of a cord set.

In the accompanying drawing, Fig. 1 illustrates one application of the switch to a cord set for a lamp; Fig. 2 is an elevation of the switch; Fig. 3 is an end view of the switch; Fig. 4 is a plan view of the switch; Fig. 5 is a view of the interior of the switch with the cover removed; Fig. 6 is a cross-sectional view in elevation of the switch; Fig. 7 is an exploded view of the switch-operating mechanism; Fig. 8 illustrates a modification of the invention with a switch employing three conductors; Fig. 9 is a sectional view through the switch of Fig. 8; Fig. 10 is a plan view of the interior of the switch of Fig. 8 with the cover removed; Fig. 11 is an exploded view of the operating elements for the modified form of switch, and Fig. 12 is an exploded view of a modification of the switch operating mechanism shown by Fig. 7.

The switch assembly 10 is adapted to be mounted as a unit upon a cord set 11 and to this end the switch is provided with a housing 12 having recesses 13 and 14 formed at each end thereof which receive the conductors 15 and 16 forming part of the cord set. One of the conductors 15 is severed and switch contacts 17 and 18 are secured to the severed ends. An arcuate recess 19 extends along the side of the housing and joins the recesses 13 and 14, so that the other conductor 16 is bowed outwardly and placed along this recess being spaced from the contacts and operating mechanism by a wall 20 forming part of the housing. The conductors are secured to the housing 12 by a cover 21 which compresses the conductors in the recesses 13, 14 and 19 and prevents relative movement between the conductors and switch. The bowed conductor 16 takes care of any strain placed upon the cord and prevents pulls on the cord from loosening the connections between the contacts and the severed conductor. In order to provide for easy installation on an appliance, the switch is assembled upon the cord at the factory and is placed at the proper position on the cord set so that the extension of the cord from the switch to the appliance is of the correct length. By providing a unitary switch and cord set, it is possible to secure quick installations upon the appliance and wastage of the cord due to incorrect positioning of the switch upon the cord set, such as might occur if the switch and cord set were sold separately, is eliminated. By way of illustration the switch has been shown as attached to a lamp L, in Fig. 1. It will, of course, be understood that the switch is not limited in use to a cord set but may be used in conjunction with any conductor or conductors.

The structural details of the switch are shown by Figs. 5 to 7, inclusive. The housing 12 is made of insulating material and is formed with a depending portion 22 providing a substantially circular well 23 extending beneath a rectangular recess 12' formed in the housing 12. The contacts 17 and 18 are formed with arcuate blade portions 24 and 25 which depend into the well 23, the blades being offset at the points 24' and 25' and seated on the shoulders formed by the intersection of the circular well 23 with the rectangular recess 12'. In order to make electrical connection with the conductors, the contacts are formed with bent-over strips 26 and 27 which are adapted to grip the bared conductors and are soldered thereto. The strips are supported upon abutments 28 and 29 and are held in position by the cover 21 so that the contacts are fastened securely within the housing. The cover is provided at each end with extending fingers 21' which are bent around the body of the housing to hold the cover in position. In order to insulate the contacts from the cover, an insulating plate 30 is inserted between the cover and the housing and overlies the contact strips as well as the conductors 15 and 16. The cover is provided with a threaded sleeve 31 which cooperates with a nut 32 to mount the switch upon the appliance with which it is to be used.

Within the well 23 is a rotatable circuit closer 33 having opposed spring fingers 34 and 35 engaging the contact blades 24 and 25. The circuit closer is provided with a bearing element 36 seated in a depression 37 formed in the bottom of the well 23 so that the circuit closer is rotatable freely to bring the fingers into contact with the contact blades when the switch is in "on" position. In "off" position the fingers nest in arcuate recesses 38 and 39 formed in the walls of the well 23 which are spaced between the contact blades so that as the fingers of the circuit closer wipe past the contacts they will snap into the recesses where they are held out of engagement with the contact blades by the spring action of the fingers. Rotation of the circuit closer is effected by means of a twisted strip or spiral 40 which is rotated by a handle 41 through the medium of a one-way clutch. The handle, which is formed of insulating material, is adapted to be reciprocated in the housing and is provided with a rectangular portion 42 seated in the recess 12' and a hollow stem portion 43 which receives the spiral strip when the handle is in depressed position. The rectangular portion 42 is provided with a recess 44 which houses a clutch disk 45 provided with outwardly extending gripping faces 46, adapted to engage the cam faces 47 forming part of the cams 48 spaced around the bottom of the recess 44. To provide for rotation of the spiral strip 40 the disk is formed with a substantially rectangular slot 49 through which the strip passes. A spiral spring 50 surrounds the strip 40 and holds the handle in operative position. In Fig. 6 the operating elements of the switch are shown in assembled relationship with the spring 50 compressed between the clutch disk and the circuit closer so that the handle is held in extended position with the rectangular portion 42 engaging the cover 21.

The switch is operated by depressing the handle against the resistance of the spring 50. Depression of the handle 41 causes an incipient rotation of the disk 45 in a clockwise direction (Fig. 7) which is prevented by engagement of the clutch faces 46 and 47 so that as the disk moves downwardly with the handle it will cause rotation of the spiral strip by means of the slot 49 to effect rotation of the circuit closer. The spiral strip is so proportioned that depression of the handle will cause the circuit closer to rotate through an angle of 90° to open or close the switch, as the case may be. The spring action of the fingers retains the circuit closer in position as the handle is released so that as the spring forces the handle and disk to return to normal position the disk will rotate counterclockwise upon the spiral strip and will pass over the cam faces 48 without being gripped thereby. In this manner it will be seen that the disk causes rotation of the spiral strip when the handle is depressed, only, but when the handle is released the disk rotates upon the spiral as it is returned to normal position.

In the modification of Figs. 8 to 11, inclusive, the switch is designed for use as a three-way switch. The switch includes a housing 51 formed of insulating material which is provided with a cone-shaped cover 52 formed of metal, the cover being insulated from the housing by a plate 53 which may be punched from insulating fiber. The cover is secured to the housing by means of fingers 52' which are bent over the body of the housing and lock the cover securely in position; in this manner the cover acts to retain the switch contacts in position. The housing is provided with a recess 54 which receives the contacts and operating mechanism.

Three contacts 55, 56 and 57, formed of resilient spring material, are disposed circumferentially around the recess and are U-shaped to cooperate with pins 58 which aid in holding the contacts in position. The pins 58 are formed integrally with the housing and extend upwardly within the U to hold the contacts between the pins and the recess. Cooperating with the contacts is a circuit closer 59 which is pivotally mounted within the housing by means of a pivot 60 engaging a depression 61 formed in the bottom of the recess. The circuit closer comprises a disk 62 of insulating material which is provided with four cam faces. A copper shell 63 provided with three cam surfaces receives the disk 62 with the copper cam surfaces engaging the cam faces formed on the disk 62. This construction provides a circuit closer having three live cam faces 64, 65 and 66 and one dead cam face 67, as best shown in Fig. 11. Rotation of the circuit closer is effected by means of a spiral strip 68, which passes through an opening 69 formed in a disk 70. The disk 70 forms part of a one-way clutch including the cam surfaces 71 formed on the enlarged head 72 of an operating handle 73. Clutch faces 74 are bent from the disk 70 and act to grip the cam surfaces 71 when the disk is rotated in a clockwise direction (Fig. 11). The handle is mounted in operative position in a sleeve 75 secured to the top of the cover 52, the sleeve being provided with a nut 76 for mounting the switch on an appliance. A spring 77 surrounds the spiral strip 68 and is compressed between the circuit closer 59 and the disk 70 so that the disk is forced against the handle to hold it in a normal extended position. The enlarged head of the handle engages the walls of a complementary recess 78 formed in the sleeve so that the handle cannot be pushed through the sleeve by the action of the spring. Rotation of the handle is prevented by keys 79 which move in grooves 80 formed in the sleeve 75.

Depression of the handle will cause locking engagement of the clutch disk 70 with the cam surfaces 71 thereby turning the spiral strip and rotating the circuit closer through an angle of 90°. When the handle is released the spring will return it to normal position as the disk 70 rotates counterclockwise over the cam surfaces 71.

One use of the three-way switch shown by Figs. 8 to 11, inclusive, is with a lamp having two filaments. In such a case the contacts are connected to three conductors 81, 82, and 83, the conductor 81 being connected to a source of current while the conductors 82 and 83 are connected to the lamp filaments. With the switch in the position shown by Fig. 10 the dead cam face 67 is in engagement with contact 56 and current will pass from conductor 81 through the shell 63 to conductor 83, only, to light one lamp filament. A single stroke of the handle will rotate the circuit closer 90° so that the current will be cut off from conductor 83 and will flow through conductor 82 to light the other lamp filament; in this position the contact 57 is in engagement with the dead cam face. Similarly, a 180° rotation of the circuit closer under two strokes of the handle will place the dead cam face under contact 55 to disconnect both filaments while a 270° rotation under three strokes of the handle will place the dead cam face between the contacts 55 and 56 and will cause both filaments to be lighted.

Fig. 12 shows a modification of the circuit closer structure, shown by Fig. 7. In the structure of Fig. 7 the circuit closer 33 and spiral strip 40 are press fitted at right angles to each other into slots formed in the bearing element 36. A different manner of assembling these elements is shown by Fig. 12. The strip 40 is provided with a flat end 84 having a slot 85 which is adapted to receive an offset portion 86 formed in the circuit closer 33. In this manner the flat end 84 is nested against the circuit closer 33 and the two elements are then inserted within a slot 87 formed in the bearing element 36 and securely held in position.

While I have described and illustrated the switch and cord set as applied to a lamp, it should be understood that they may be applied to any electrical appliance.

What we claim as new and desire to secure by Letters Patent of the United States, is:

1. In an electric switch, an operating handle having a clutch face thereon, a clutch disc cooperating with said clutch face, said disc having a slot therein, a spiral strip movable in said slot, one end of said strip having a slot therein, a contact strip nested in said slot having contacts formed at each end, a bearing element uniting said contact and spiral strips, a housing supporting said bearing element and mounting said contacts for rotation, and stationary contacts cooperating with said movable contacts as said movable contacts are rotated upon movement of said handle.

2. In an electric switch, an operating handle having a clutch face thereon, a clutch disk cooperating with said clutch face, said disk having a slot therein, a spiral strip movable in said slot, one end of said strip being formed with a flat portion having a slot therein, a flat contact strip having an offset portion positioned within the slot in said strip and being formed with flexible contacts at each end, a bearing element having a slot for receiving said flat and offset portions in nested relationship for uniting said contact and spiral strips, a housing supporting said bearing element and mounting said flexible contacts for rotation and stationary contacts cooperating with said flexible contacts as they are rotated upon movement of said handle.

3. In an electric switch, a housing having a polygonal recess therein and formed with abutments adjacent said recess, said housing having a circular well extending beneath said recess and merging therewith to form shoulders, stationary contacts having blade portions mounted in the wall of said well and being formed with offset portions seated on said shoulders, said contacts extending through said recess and having bent-over portions engaging said abutments, a circuit closer rotatably mounted in said well and cooperating with said contact blades to control the circuit therethrough, an operating handle of insulating material having a polygonal portion reciprocable in said recess, a spiral strip connected to said circuit closer, and clutch means interconnecting said handle and strip whereby reciprocation of said handle rotates said strip and circuit closer, the polygonal portion of said handle cooperating with said recess to prevent rotation of said handle upon operation thereof and a cover having an opening for receiving said handle and clamping the strip portions of said contacts against said abutments to hold them in position.

FRANK D. BRYANT.
WILLIAM R. YOUNG.